Oct. 18, 1966 V. E. WEISS 3,279,398
DOUGH FORMING MACHINE AND PROCESS
Filed Feb. 14, 1964 2 Sheets-Sheet 1

INVENTOR.
VERNE E. WEISS
BY Robert B. Hughes
ATTORNEY

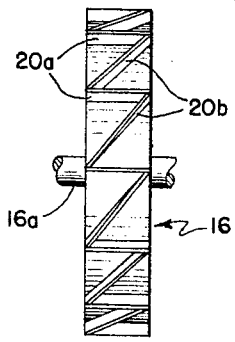
FIG. 2
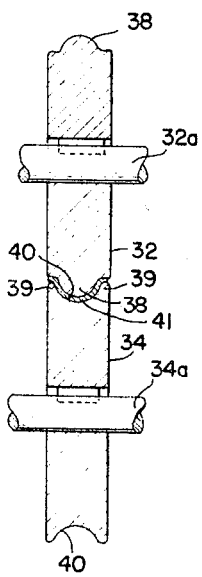
FIG. 3
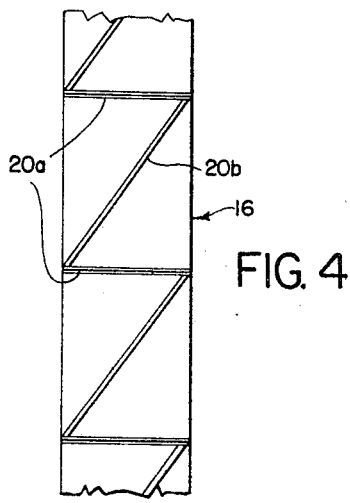
FIG. 4
FIG. 6
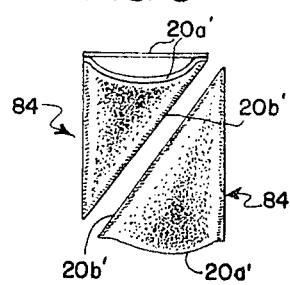
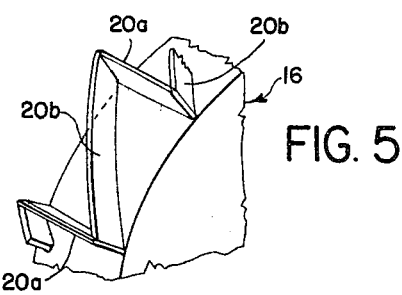
FIG. 5
INVENTOR.
VERNE E. WEISS
BY Robert B. Hughes
ATTORNEY United States Patent Office 3,279,398
Patented Oct. 18, 1966

3,279,398
DOUGH FORMING MACHINE AND PROCESS
Verne E. Weiss, Minneapolis, Minn., assignor to General Mills, Inc., a corporation of Delaware
Filed Feb. 14, 1964, Ser. No. 344,953
12 Claims. (Cl. 107—54)

This invention relates to a process and apparatus for forming a food material such as a pliable cooked dough into tapered or generally cone-shaped shells.

The subject matter of the present invention was devised specifically to be part of an overall process of making a snack product in which the individual snack pieces have a distinctive tapered or conical shape. Such a configuration is advantageous in various respects; for example, it is strong structurally so that the snack pieces will not readily break or crumble during handling or packaging. Also snack pieces or shells so shaped have an attractive appearance, and when these snack pieces are served, the cavity formed by each can very conveniently be filled with a dip or spread.

In making snack items of this general type, there are many variations, but a common method is that a food material (e.g. cereal) is cooked with water and other ingredients to form a moist cooked dough which is fairly pliable. The dough, while still in this pliable condition, is desirably cut or shaped in some manner to form individual snack pieces, which are dried and then deep fried to form the end product.

While it is most practical to form or shape the dough while it is fairly moist and pliable, there are still certain problems involved. For example, the dough is somewhat sticky, which is some source of difficulty. Further, although the dough is pliable, it is still somewhat resilient so that if it is deformed to any great extent, it will tend to pull back somewhat toward its original shape. On the other hand, it is not practical to form the dough with excessive pressures or else the character of the end product may be degraded. Also in cutting or shaping the dough, precaution must be taken against contaminating the same. Understandably these problems are intensified when the formation of dough units is attempted on a large scale commercial operation.

Accordingly, it is an object of the present invention to provide a practical and generally advantageous apparatus and method whereby a material such as cooked dough can expeditiously be formed into shell-like units of generally tapered or conical configuration, and particularly that this be capable of being accomplished on a commercial scale.

It is a further object to provide a method and apparatus which accomplishes the aims of the preceding object by utilizing a tubular length of material, cutting the same transversely at predetermined locations therealong with relatively sharp cutting means so as not to seal the material along such transverse cuts, and also utilizing blunt cutting means to cut and seal said material along diagonal lines, each of which lines extends generally between a respective proximate pair of transverse cuts to form from each portion of material between a proximate pair of cuts two generally cone shaped pieces of material.

It is yet another object to accomplish the ends of the preceding objects by means of two generally tangent oppositely rotating wheels, the aforementioned sharp cutting means being provided on at least one of said wheels, and the aforementioned blunt cutting means also being provided on at least one of said wheels.

It is a more particular object to resist flattening of the conical pieces of material by utilizing a tubular length of material formed of two elongate strips joined one to another by the longitudinal edge portions thereof, one of said strips being of greater width than the other so that in cross sectional configuration, the wider strip is generally U-shaped while the narrower strip is generally flat.

These and other objects and features of the invention will be more readily understood and appreciated from the following detailed description of the preferred embodiments thereof selected for purposes of illustration and shown in the accompanying drawings, in which:

FIGURE 2 is a side elevational view taken on lines 2—2 of FIGURE 1 and showing the cutting wheel of the present invention;

FIGURE 3 is a fragmentary sectional view taken on line 3—3 of FIGURE 1;

FIGURE 4 is a lay-out view of a portion of the periphery of the cutting wheel;

FIGURE 5 is a fragmentary perspective view of a peripheral portion of the cutting wheel;

FIGURE 6 is a perspective view of a pair of generally cone shaped pieces formed from a segment of dough material.

Figure 1:
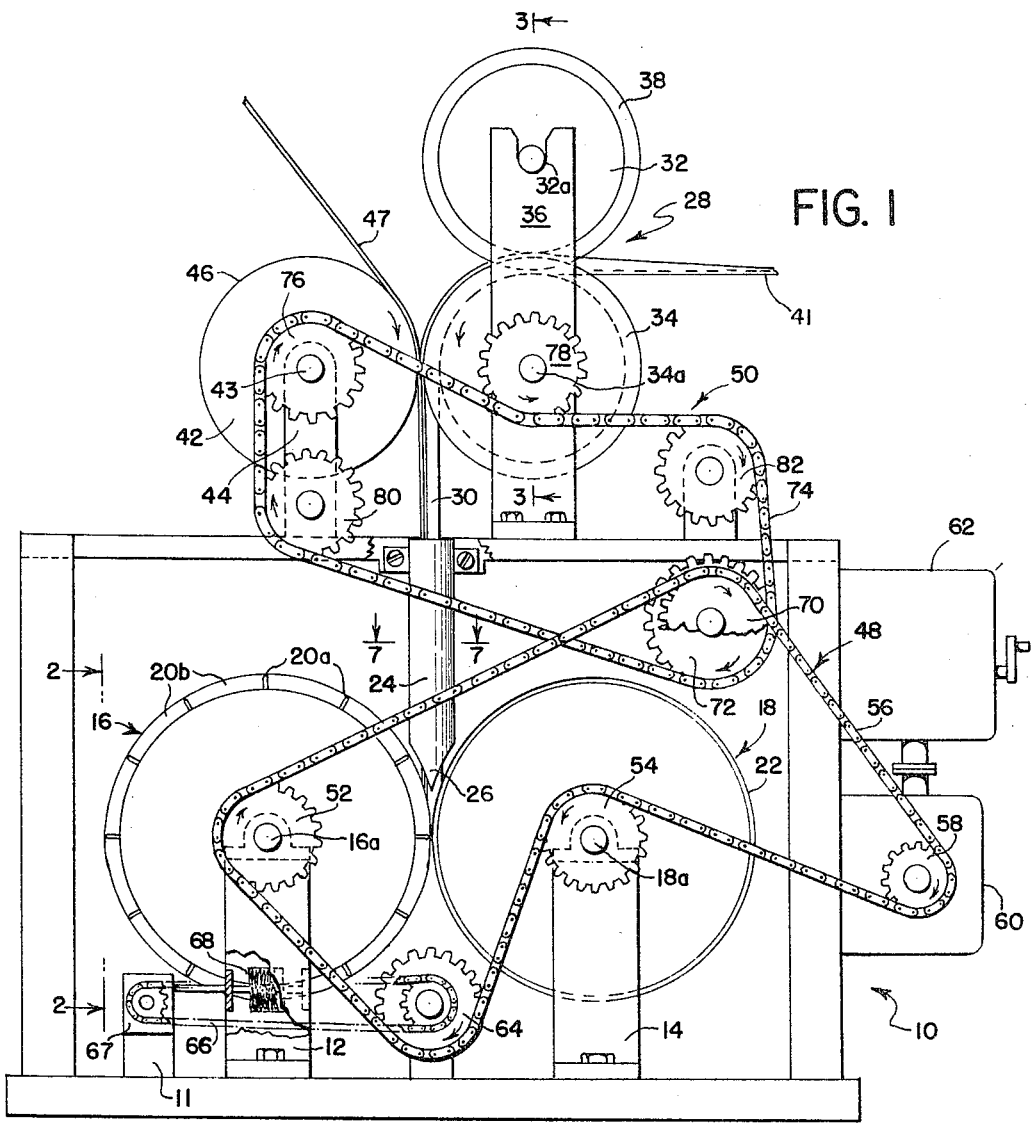
FIGURE 1 is a front elevational view of an apparatus embodying preferred teachings of my invention.

Referring to the accompanying drawings, numeral 10 designates a frame having a pair of laterally spaced mounting brackets 12 and 14 to carry, respectively, a cutting wheel 16 and a backing wheel 18 by means of a respective one of two longitudinally aligned shafts 16a and 18a, so that each wheel 16 or 18 is able to rotate about its longitudinally aligned center axis. These wheels 16 and 18 are arranged side by side so as to be tangent to one another and lie in the same transverse plane.

The cutting wheel 16 has the entire circumference thereof formed with a plurality of cutting blades which are directed radially outward from the wheel 16 and which form a continuous "Z" pattern about the entire periphery of the wheel 16. Thus these cutting blades comprise a plurality of transversely aligned blades 20a (i.e. aligned perpendicular to the circumference of the wheel 16 but parallel to the longitudinal axis thereof) and an equal number of diagonal blades 20b, each of which reaches from the front end of one transverse blade 20a to the rear end of a related proximate transverse blade 20a. The outwardly directed cutting edge of each of the transverse blades 20a is made relatively sharp so that in cutting through two layers of dough material, the edge portions along which the dough material is cut will not be joined one to another. On the other hand, the outwardly directed cutting edge of each diagonal blade 20b is made somewhat blunt, so that these blades 20b can perform both a cutting and a sealing function in forming cone shaped dough pieces. The cutting edges of the blades 20a and 20b are so contoured that they collectively define a cylindrical plane having a center axis coincident with that of the wheel 16.

The backing wheel 18 presents a smooth cylindrically curved circumferential surface 22 which cooperates with the blades 20a and 20b to cut the cone-shaped dough pieces. This surface portion 22 of the wheel 18 is made desirably from moderately hard rubber so that the blades 20a and 20b can perform their cutting function by coming into contact with the surface 22 at the location where the wheel 18 is tangent to the wheel 16 (the cylindrical plane defined by the cutting edges of blades 20a and 20b being considered the circumference of the wheel 16), but without the relatively sharp cutting edges of the transverse blades 20a being dulled prematurely by such contact.

The tubular dough material to be formed into individual cone-shaped pieces or units is fed downwardly along the tangent line of the wheels 16 and 18 into a cutting area which is at the location of tangency of the wheels 16 and 18. To properly direct this dough material into this cutting area, there is provided a vertically aligned tubular guideway 24 positioned directly above the cutting area between the two wheels 16 and 18. The lower end of this guideway 24 has the side portions thereof cut away to accommodate the wheels 16 and 18 so that there is formed tapered front and rear portions 26 at the lower end of the guideway 24, which portions 26 extend quite closely to the point of tangency of wheels 16 and 18 so that the guideway 24 can better direct the dough material into the cutting area.

Mounted from the base frame 10 and positioned above the wheels 16 and 18 and the guideway 24, is a mechanism, generally designated 28, which functions both to form a tubular rope of dough (shown at 30) and feed the same through the guideway 24 and into the cutting area defined by the wheels 16 and 18. This mechanism 28 comprises a matching pair of rollers 32 and 34 journal mounted, one above the other, at 32a and 34a, respectively, from a bracket 36 secured to the base frame 10. The upper roller 32 is formed with a circumferential ridge 38 which mates with a circumferential groove 40 formed in the lower roller 34 in a manner that there are two circumferential ridges 39, one on each side of the groove 40. With these rollers 32 and 34 rotating oppositely, a flat strip 41 of dough fed lengthwise therebetween takes on a U-shaped cross sectional configuration.

A third roller 42, journal mounted at 43 from the base frame 10 by means of a bracket 44, is located beside and co-planar with the lower grooved roller 34, and is very nearly tangent thereto. The circumferential surface 46 of this roller 42 is cylindrically curved and cooperates (in a manner to be described more fully hereinafter) with the grooved roller 34 to join a flat strip of dough 47 to the strip 41 to form continuously the tubular length of dough 30 which is fed into the guideway 24. The area between these two rollers 42 and 34 is accordingly called the "forming area."

The cutting wheel 16 and blocking wheel 18 are driven, respectively, clockwise and counter-clockwise (as seen in FIGURE 1) so that the peripheral portions of these wheels 16 and 18 travel downwardly into the cutting area defined thereby. In like manner, the forming rollers 42 and 34 are also driven, respectively, clockwise and counter-clockwise so that the peripheral portions thereof travel downwardly into the forming area between the rollers 42 and 34. To so turn the wheels 16 and 18 and the rollers 42 and 34, there is provided a pair of chain and sprocket drives, designated 48 and 50, respectively.

In the particular arrangement shown herein, the drive 48 comprises a pair of sprockets 52 and 54 fixed to, respectively, shafts 16a and 18a of wheels 16 and 18, and driven by a chain 56 from a sprocket 58 through a transmission 60 from a motor 62 mounted to the base frame 10. This drive 48 also turns a gear 64 which, through a chain and sprocket unit 66 and right angle gear box 67, drives a pair of brushes (one of which is shown at 68), which brushes 68 are located one in front of and one behind the wheel 16 so as to engage the blades 20a and 20b of the cutting wheel 16 to remove the cone-shaped dough pieces cut by the wheel 16. Desirably, these brushes 68 are at the lower edge of the wheel 16 and rotate along a respective axis perpendicular to the axis of rotation of the wheel 16.

The chain 56 provides power for the other chain and sprocket drive 50 by turning a gear 70 which is fixed to a second gear 72 which engages a chain 74 of the drive 50. This chain 74 in turn engages gears 76 and 78, fixed to, respectively, rollers 42 and 34. Suitable idler gears are provided as at 80 and 82.

In operation, the motor 60 through the drives 48 and 50 turns the wheels 16 and 18 clockwise and counter-clockwise, respectively, and in the same manner turns the rollers 42 and 34. The drives 48 and 50 are such that the circumferential speed of wheels 16 and 18 and rollers 42 and 34 are all substantially equal. The strip of dough material shown at 41 is fed lengthwise between the mating rollers 32 and 34 generally along the tangent line of these rollers 32 and 34, the dough strip engaging the rollers 32 and 34 so that the roller 32 is caused to turn at the same circumferential speed as the roller 34. The circumferential ridge 38 presses the strip 41 into the groove 40 so as to give this dough strip 41 a generally U-shaped cross sectional configuration. The strip 41 remains against the roller 34 and thus remains contoured in the circumferential groove 40 thereof as it travels into the forming area between the rollers 42 and 34.

Figure 7:
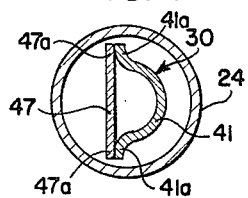
FIGURE 7 is a plan sectional view taken on line 7—7 of FIGURE 1, and drawn to an enlarged scale.

The other strip of dough 47 is somewhat narrower than the first mentioned strip 41, and is fed lengthwise downwardly into the forming area (i.e. that area between rollers 42 and 34) in a manner that this strip 47 is in contact with the circumferential face 46 of the roller 42 immediately before this strip 47 travels into this forming area. (Although not shown herein, it is to be understood that suitable guideways would be provided to properly direct the dough strips 41 and 47 into the forming and feeding mechanism 28.) The circumferential edge portions 39 on either side of the groove 40 of the roller 34 press the edge portions 41a of the strip 41 against the edge portions 47a of the strip 86 so as to join the two strips 41 and 47 along their longitudinal edge portions 41a and 47a, thus creating the tubular length of dough 30 which is fed into the guideway 24 to travel between the wheels 16 and 18. It will be noted (as illustrated in FIGURE 7) that the edge portions 41a and 47a of the strips 41 and 47 are pressed flat against one another with each pair of joining edge portions 41a–47a forming a small ridge extending a short distance outwardly from the length of dough 30, with the one strip 41 having a general U cross sectional configuration and the other strip 47 being substantially flat.

The tube of dough 30 continuously moves through the guideway 24 and into the cutting area at a speed which is substantially the same as the linear rate of speed of the wheels 16 and 18 at the circumference thereof. As each of the blades 20a and 20b moves into the cutting area, the sharp edge transverse blades 20a cut across the dough tube 30 cleanly so that dough is not sealed along such transverse cuts. However, the blunt edged diagonal blades 20b not only cut the dough diagonally between the transverse cuts, but seal the dough along such diagonal cuts so that each segment of dough cut by proximate transverse blades 20a is formed into two cone-shaped parts or pieces, illustrated at 84 in FIGURE 6. The edge of each cone 84 which defines the open base of the cone is cut by a transverse edge 20a, and such edge is accordingly designated 20a', while the diagonal edge along which each piece 84 is cut and sealed, is in like fashion designated 20b'. The rotation of the cutting wheel 16 carries the dough units 84 out of the cutting area, and the brushes 68 remove the pieces 84 from the wheel 16, after which the pieces 84 are collected by suitable means for further processing.

It is to be understood that it is within the purview of the broader aspects of the present invention to form the tubular dough material 88 in some other manner (e.g. by extrusion, etc.). However, it is important to note that forming the tubular dough 30 in the particularly manner shown herein has been discovered to be especially effective in preventing the cones 84 from collapsing during the cutting operation.

It should be understood that the foregoing is merely illustrative of a certain embodiment of the invention and many variations may be made by those skilled in the art without departing from the spirit and scope of the invention.

Now therefore, I claim:

1. A process for forming material such as pliable cooked dough, said process comprising:

(a) feeding a tube of said material into a cutting area, (b) cutting said tube of material transversely so as to make transverse cuts through said tube of material at predetermined locations therealong, (c) cutting diagonally generally between such transverse cuts so as to separate segments of material between adjacent pairs of transverse cuts into two parts of said material.

2. The process as recited in claim 1, wherein said transverse cuts are made with relatively sharp cutting edge means so as to prevent sealing of said material along said transverse cuts, and said diagonal cuts are made with relatively blunt cutting edge means so as to seal said material along said diagonal cuts.

3. The process as recited in claim 2, wherein said tube is formed of two elongate strips joined one to another by the longitudinal edge portions thereof, one of said strips being wider than the other, with the one strip having a general U-shape in cross sectional configuration, while the other of said strips is substantially flat.

4. The process as recited in claim 1, wherein said transverse and diagonal cuts are made by the method of oppositely rotating two generally tangent wheels on which are provided cutting means to make said transverse and diagonal cuts.

5. An apparatus to form a material such as pliable cooked dough, said apparatus comprising:

(a) wheel means comprising a pair of oppositely rotating wheels, generally tangent to one another so as to define a line of tangency, the area between said wheels being a cutting area, (b) means to feed a tubular rope of said material lengthwise into said cutting area generally parallel to said line of tangency, (c) transverse blade means mounted on the periphery of one of said wheels so as to cut with transverse cuts across said tubular rope of material, and (d) diagonal blade means mounted on the periphery of one of said wheels to cut with diagonal cuts said tubular rope generally between transverse cuts made by said transverse blade means.

6. The apparatus as recited in claim 5, wherein said transverse blade means comprises a plurality of transverse blades, each of which has a sharp cutting edge so as to cut through said material and prevent sealing along said transverse cuts, and said diagonal blade means comprises a plurality of diagonal blades, each of which has a relatively dull cutting edge so as to seal said material along diagonal cuts made by each of said diagonal blades.

7. The apparatus as recited in claim 6, wherein said transverse and diagonal blades are mounted on the peripheral face of one of said wheels in a continuous generally "Z" pattern.

8. An apparatus to form a material such as pliable cooked dough, said apparatus comprising:

(a) a mounting frame, (b) a cutting wheel rotatably mounted to said frame, said wheel having a plurality of transverse and diagonal blades mounted on the circumference thereof in a continuous generally "Z" pattern, with cutting edges of said blades being directed outwardly, (c) a backing wheel mounted to said frame so as to be generally tangent to said cutting wheel and rotatable oppositely to said cutting wheel, said wheels thus defining a general line of tangency, (d) means to feed a tubular length of said material between said cutting wheel and said backing wheel generally along said line of tangency, and (e) power means to turn said wheels and to operate said feed means.

9. The apparatus as recited in claim 8, wherein there are guide means to direct said material from said feed means to a location between said cutting and backing wheels.

10. The apparatus as recited in claim 8, wherein said feed means comprises first means to feed a strip of material having a generally U-shape cross sectional configuration into a forming area and second means to join longitudinal edge portions of said strip to edge portions of a second strip of material which is substantially flat.

11. The apparatus as recited in claim 10, wherein said first means comprises a pair of mating rollers, one of said rollers having a circumferential ridge, and the other of said rollers having a circumferential groove mating with said ridge.

12. The apparatus as recited in claim 11, wherein said second means comprises a third roller generally tangent to said grooved roller and rotatable oppositely with respect to said grooved roller.

References Cited by the Examiner

UNITED STATES PATENTS

| | | | |
|---|---|---|---|
| 2,157,054 | 5/1939 | Gammeter | 93—8 |
| 2,622,055 | 12/1952 | Lieder | 156—515 X |
| 2,718,105 | 9/1955 | Ferguson et al. | 93—8 |

WALTER A. SCHEEL, *Primary Examiner.*

JOSEPH SHEA, *Assistant Examiner.*